(12) United States Patent　　　　(10) Patent No.:　US 12,665,933 B1

Solomon　　　　　　　　　　　　(45) Date of Patent:　Jun. 23, 2026

(54) DETERMINING POLICY CONTENT-BASED CONTROLS FOR REAL-TIME SECURITY AND COMPLIANCE MONITORING

(71) Applicant: DRATA INC., San Diego, CA (US)

(72) Inventor: Lior Solomon, Haworth, NJ (US)

(73) Assignee: DRATA INC., San Diego, CA (US)

( * ) Notice: Subject to any disclaimer, the term of this patent is extended or adjusted under 35 U.S.C. 154(b) by 2 days.

(21) Appl. No.: 18/677,814

(22) Filed: May 29, 2024

(51) Int. Cl.
　　*H04L 9/40*　　　　　(2022.01)
(52) U.S. Cl.
　　CPC .................................... *H04L 63/20* (2013.01)
(58) Field of Classification Search
　　CPC ...................................................... H04L 63/20
　　USPC ............................................................. 726/1
　　See application file for complete search history.

(56)　　　　　　References Cited

U.S. PATENT DOCUMENTS

| | | | |
|---|---|---|---|
| 7,536,456 B2 | 5/2009 | Williams et al. | |
| 8,225,371 B2 | 7/2012 | Jones et al. | |
| 10,205,593 B2 | 2/2019 | Biesinger et al. | |
| 10,922,423 B1 | 2/2021 | Rungta et al. | |
| 11,176,129 B2 * | 11/2021 | Fan ........................... | G06F 9/52 |

| | | | |
|---|---|---|---|
| 2007/0180490 A1 | 8/2007 | Renzi et al. | |
| 2008/0083012 A1 | 4/2008 | Yu et al. | |
| 2020/0285642 A1 * | 9/2020 | Bei .......................... | G06N 5/01 |
| 2023/0016877 A1 * | 1/2023 | Gusev ................. | H04L 67/1014 |
| 2024/0143774 A1 | 5/2024 | Ramirez-Cunarro | |
| 2024/0256663 A1 | 8/2024 | Thompson | |
| 2024/0265106 A1 | 8/2024 | Mehta et al. | |
| 2025/0053662 A1 | 2/2025 | Misra et al. | |
| 2025/0131093 A1 | 4/2025 | Sharieh et al. | |
| 2025/0272317 A1 * | 8/2025 | Aggarwal ........... | G06F 16/3329 |
| 2025/0363076 A1 | 11/2025 | Green et al. | |

* cited by examiner

*Primary Examiner* — Anthony D Brown

(57)　　　　　　ABSTRACT

Determining policy content-based controls for real-time security and compliance monitoring including receiving, from a user computing system, a user-generated policy document associated with an organization; creating a set of user-generated control language records from the user-generated policy document, wherein each user-generated control language record corresponds to a description of a control in the user-generated policy document; converting each user-generated control language record in the set of user-generated control language records into a user-generated control language code; matching each user-generated control language code to a stock control language code within a stock control language code repository; and presenting, on the user computing system, the set of controls associated with the matched stock control language codes as controls for the user-generated policy document.

20 Claims, 8 Drawing Sheets

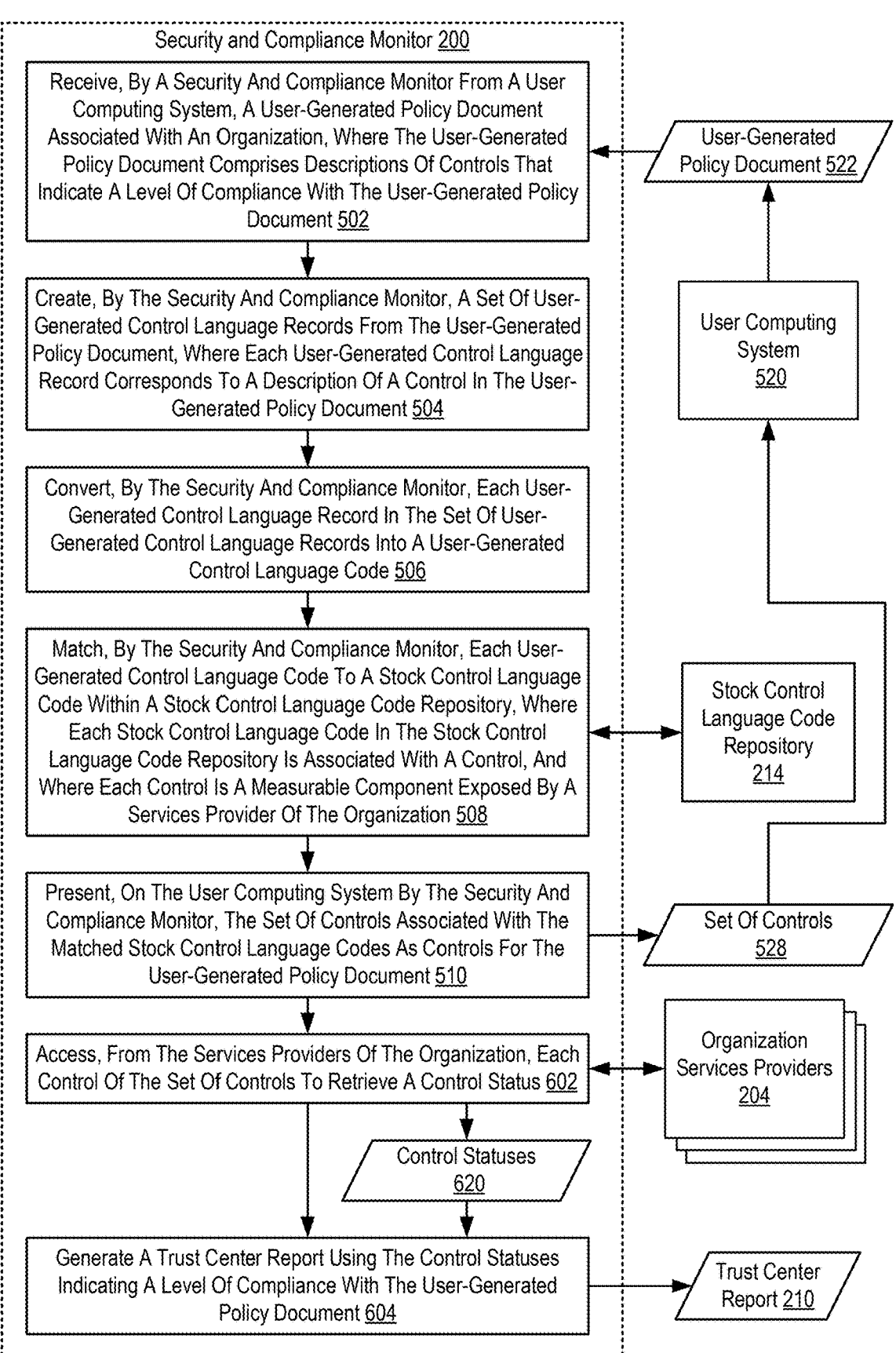

Security and Compliance Monitor 200

Receive, By A Security And Compliance Monitor From A User Computing System, A User-Generated Policy Document Associated With An Organization, Where The User-Generated Policy Document Comprises Descriptions Of Controls That Indicate A Level Of Compliance With The User-Generated Policy Document 502

User-Generated Policy Document 522

Create, By The Security And Compliance Monitor, A Set Of User-Generated Control Language Records From The User-Generated Policy Document, Where Each User-Generated Control Language Record Corresponds To A Description Of A Control In The User-Generated Policy Document 504

User Computing System 520

Convert, By The Security And Compliance Monitor, Each User-Generated Control Language Record In The Set Of User-Generated Control Language Records Into A User-Generated Control Language Code 506

Match, By The Security And Compliance Monitor, Each User-Generated Control Language Code To A Stock Control Language Code Within A Stock Control Language Code Repository, Where Each Stock Control Language Code In The Stock Control Language Code Repository Is Associated With A Control, And Where Each Control Is A Measurable Component Exposed By A Services Provider Of The Organization 508

Stock Control Language Code Repository 214

Present, On The User Computing System By The Security And Compliance Monitor, The Set Of Controls Associated With The Matched Stock Control Language Codes As Controls For The User-Generated Policy Document 510

Set Of Controls 528

Access, From The Services Providers Of The Organization, Each Control Of The Set Of Controls To Retrieve A Control Status 602

Organization Services Providers 204

Control Statuses 620

Generate A Trust Center Report Using The Control Statuses Indicating A Level Of Compliance With The User-Generated Policy Document 604

Trust Center Report 210

FIG. 6

DETERMINING POLICY CONTENT-BASED CONTROLS FOR REAL-TIME SECURITY AND COMPLIANCE MONITORING

BRIEF DESCRIPTION OF DRAWINGS

FIG. 6 sets forth a flow chart illustrating an exemplary method for determining policy content-based controls for real-time security and compliance monitoring according to embodiments of the present invention.

DESCRIPTION OF EMBODIMENTS

Many businesses employ external service providers to perform various aspects of the business's operations. At the same time, businesses are increasingly subject to regulations and standards that require specific procedures to be followed and documented. As businesses continue to expand utilization of cloud-based systems and services, the need for monitoring the security, privacy, and confidentiality of data that passes through or is stored on the third-party systems and services also increases.

Figure 1:
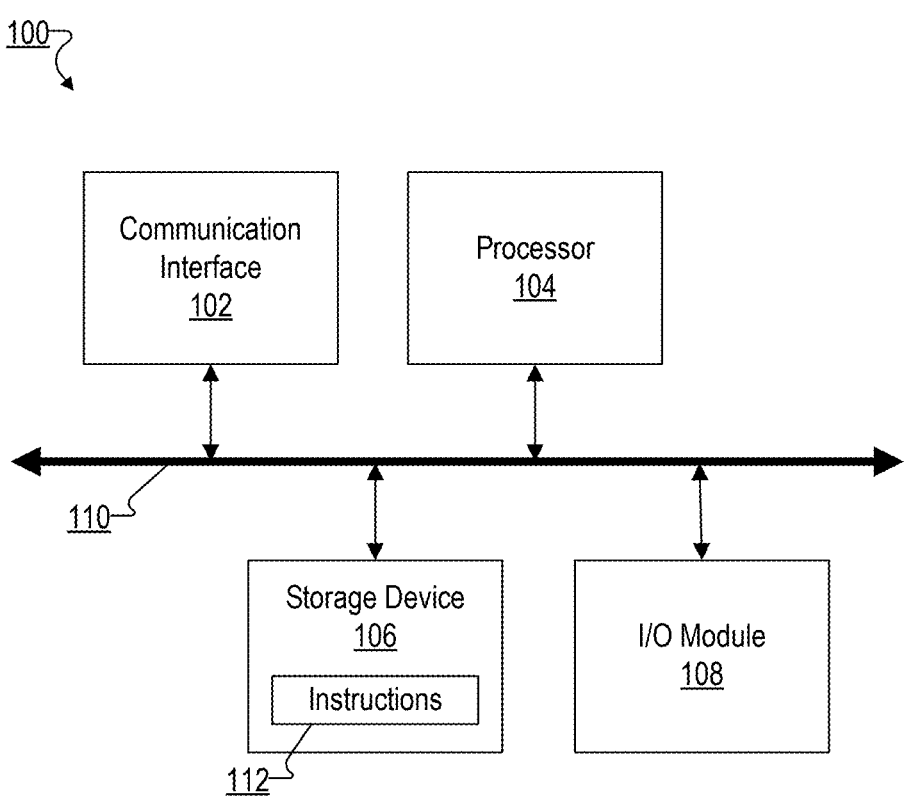
FIG. 1 illustrates an example computing device for security and compliance monitoring in accordance with some implementations.

Example methods, apparatus, and products for determining policy content-based controls for real-time security and compliance monitoring in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
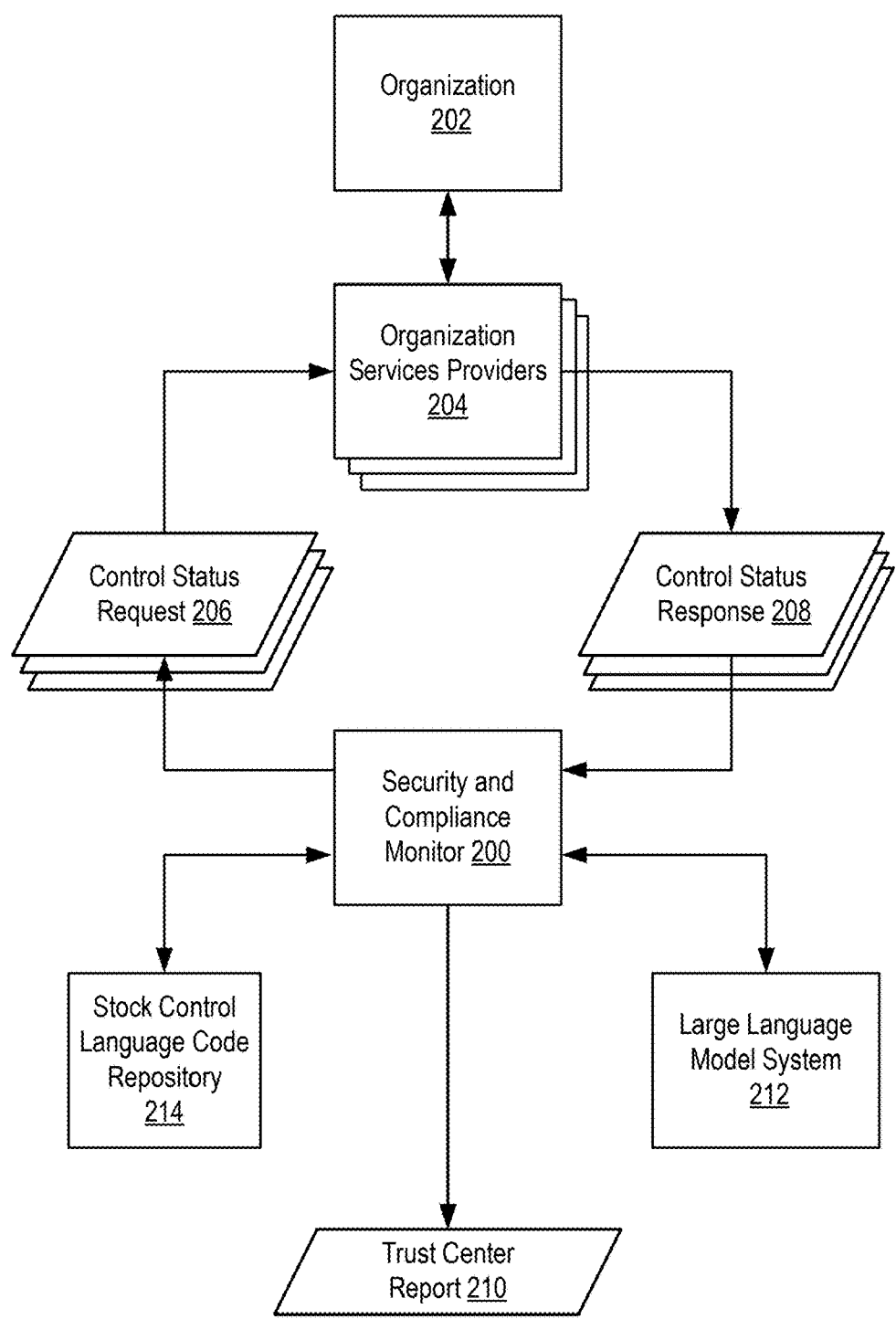
FIG. 2 illustrates an example system for security and compliance monitoring in accordance with some implementations.

For further explanation, FIG. 2 illustrates an exemplary block diagram depicting a system for security and compliance monitoring in accordance with some embodiments of the present disclosure. The system of FIG. 2 includes a security and compliance monitor 200, an organization 202, multiple organization services providers 204, a stock control language code repository 214, and a large language model (LLM) system 212. The security and compliance monitor 200 issues control status requests 206 to the organization services providers 204 and, in response, receives the control status responses 208. The security and compliance monitor 200 also uses the control status responses 208 to generate the trust center report 210.

Each element presented may be hosted by, or be comprised of, one or more computing systems (not shown). Specifically, the security and compliance monitor 200 may be hosted by one or more security and compliance monitor computing systems, the organization 202 may include multiple organization computing systems, each organization services provider 204 may be hosted by one or more cloud-based services provider computing systems, and the LLM system 212 may be hosted by one or more LLM computing systems.

The security and compliance monitor 200 is hardware, software, or an aggregation of hardware and software configured to determine a degree to which an organization 202 is complying with a particular security and compliance policy. Specifically, the security and compliance monitor 200 monitors a set of controls for service providers that support the organization 202. Each control monitored by the security and compliance monitor 200 is associated with at least one element of a security and compliance policy. The security and compliance monitor 200 uses the status of each control to compile the trust center report 210 detailing the compliance status of the organization 202 with regard to the security and compliance framework.

The organization 202 is a cloud-based services client. The organization 202 is an entity that utilizes the services provided by the organization services providers 204. The organization 202 may be an organization that itself provides a service or product to other clients utilizing the collection of services supplied by the organization services providers 204. For example, the organization 202 may be a software developer that utilizes cloud-based services including cloud-based storage, cloud-based development tools, cloud-based ticketing, and cloud-based human resources.

The organization 202 may be a "cloud-native" organization that creates products using cloud-based services providers. The organization 202 may be "cloud-first" and exclusively utilize computing resources, applications, and systems provided by organization services providers 204 for some or all aspects of the organization. Regardless of the level of reliance on organization services providers 204, in order to be in full compliance with any legally- or operationally-required policies and frameworks, the organization 202 must verify that each organization services providers 204 is operating in a manner consistent with those frameworks.

The organization services providers 204 are entities that supply a resource or product to the organization 202 over a wide-area network. Each organization services providers 204 may be a cloud-based services provider and include a collection of computer systems working in concert to provide the resource or product over the Internet (examples of which are described below in reference to FIG. 3). In addition to providing the resource or product, each organization services providers 204 also exposes an interface allowing the security and compliance monitor 200 to retrieve control statuses from the organization services providers 204.

The organization 202 may utilize other services that are not cloud-based services (relative to the organization 202). Specifically, the organization 202 may include services (e.g., enterprise productivity suites, virtualization software, etc.) provided by other entities and hosted on computing systems under the control of organization 202 (i.e., not on a separate services provider system). For such services, the security and compliance monitor 200 sends the control status requests 206 to the computing systems of the organization 202 instead of a third-party computing system.

As discussed above, the organization 202 is an entity obligated to abide by security and compliance policies (including standards frameworks) for legal and/or business purposes. A security and compliance policy is a group of assurances and procedures related to the manner in which an organization conducts its operation. A standards framework (also referred to as a security and compliance framework)

defines procedures that must be followed, tracked, and documented in order to comply with the particular law or standard around which the framework has been constructed. Many policies and standards frameworks describe the manner in which customer or employee data must be managed. Other policies and standards frameworks describe the disclosure or training obligations to employees or customers. A policy document is data storing a security and compliance policy, such as a text file.

The security and compliance monitor 200 maintains a set of security and compliance polices that include both standards frameworks and template policies. A template policy is a security and compliance policy that includes standard, common, and/or general obligations related to the policy purpose. Examples of template policies include privacy policies, data governance policies, and cyber security policies. The standards frameworks may include, for example, a System and Organization Controls (SOC) framework, an International Organization for Standardization (ISO) framework, a Health Insurance Portability and Accountability Act (HIPAA) framework, a General Data Protection Regulation (GDPR) framework, a Sarbanes-Oxley Act (SOX) framework, a Payment Card Industry Data Security Standard (PCI DSS) framework, and a California Consumer Privacy Act (CCPA) framework.

Each security and compliance policy may be composed of human-readable text detailing the obligations of the entity to be in compliance with the policy. Each obligation may be tracked using a control. A control is a measurable component exposed by a services provider. For example, one obligation of a policy may dictate that, when stored, user data must be encrypted using a specified minimum standard. This obligation may be tracked using two controls: a first control may be whether or not the user data is encrypted and a second control may be the level of encryption employed.

A control status is the state of the control retrieved from the services provider (e.g., organization services providers 204). The control status may be a Boolean response (i.e., true or false), a selection from a group (e.g., low, medium, or high), or some other form of data. The control status is retrieved from the services provider using a control status request and control status response. Obtaining the control statuses may be performed using control status requests 206 and control status responses 208. A control status request 206 is a message targeting a particular services provider 204 requesting information about a control. The control status request 206 may include code that instructs the particular services provider 204 to generate a control status response 208. A control status response 208 is a message that describes the state of a particular control within the services provider 204. The control status responses 208 may be in the form of a state specification. A state specification is a collection of data that conveys data objects from one system to another. The state specification may be a standard file format used to exchange data in asynchronous browser-server communication. For example, the state specification may be a JavaScript Object Notation specification.

The LLM system 212 is a system for processing natural language. The LLM system 212 receives queries for processing natural language, such as a request to summarize text or to compare two or more sets of text, and responds with a query response based on the requested output. The LLM system 212 may also receive a first vector and set of other vectors and determine to which of the set is the first vector most similar. Communication with the LLM system 212 may be performed using application programming interface (API) calls to the LLM system. For example, the security and compliance monitor 200 may use an API call to the LLM system 212, along with a set of user-generated control language codes and a set of stock control language codes, to request an identification of the stock control language codes that are most similar to the user-generated control language codes.

Each control is described within the security and compliance monitor 200 using a control language record. A control language record is a description of a control. Each control language record may include human-readable text, such as a category of the control, description of the control, activities for the control, keywords associated with the control, types of services providers queried using the control, control statuses for the control (e.g., encrypted, not encrypted, true, false, etc.), and API calls to retrieve the control status. The control language record may also include non-human readable elements used by the security and compliance monitor 200 to identify and categorize the control language record. The user-generated control language record may be created using an LLM system 212. A control language record created from a user-generated policy document is referred to as a user-generated control language record. Similarly, a control language record created and/or maintained by the security and compliance monitor 200 is referred to as a stock control language record.

The following is an example of a control language record:
[{"control_language": "Data must be handled and protected according to its classification requirements and following approved encryption standards, if applicable."},
{"control_language": "Whenever possible, store data of the same classification in a given data repository and avoid mixing sensitive and non-sensitive data in the same repository. Security controls, including authentication, authorization, data encryption, and auditing, should be applied according to the highest classification of data in a given repository."}]

The stock control language code repository 214 is a collection of stock control language codes. A stock control language code is data that represents a stock control language record mathematically. Specifically, each stock control language code is the output of a conversion process applied to a particular stock control language record and utilized for greater comparability (relative to the human-readable form of the stock control language record). The stock control language code repository 214 may be a data structure stored within memory accessible by the security and compliance monitor 200. The stock control language code repository 214 may be, for example, a vector database with the stock control language codes ingested using embedding documents. The stock control language code repository 214 is used to determine a stock control language record that is the closest match to a given control described within user-generated policy document (as described below in FIGS. 5-8).

The trust center report 210 is a collection of control statuses that correspond to the obligations of a particular security and compliance policy. The trust center report 210 conveys the compliance state of the organization with regard to the particular security and compliance policy. The trust center report 210 may be provided in response to a request by an auditor or organization client. Further, the trust center report 210 may be generated in response to regulatory obligations or as a condition of a particular business agreement.

Figure 3:
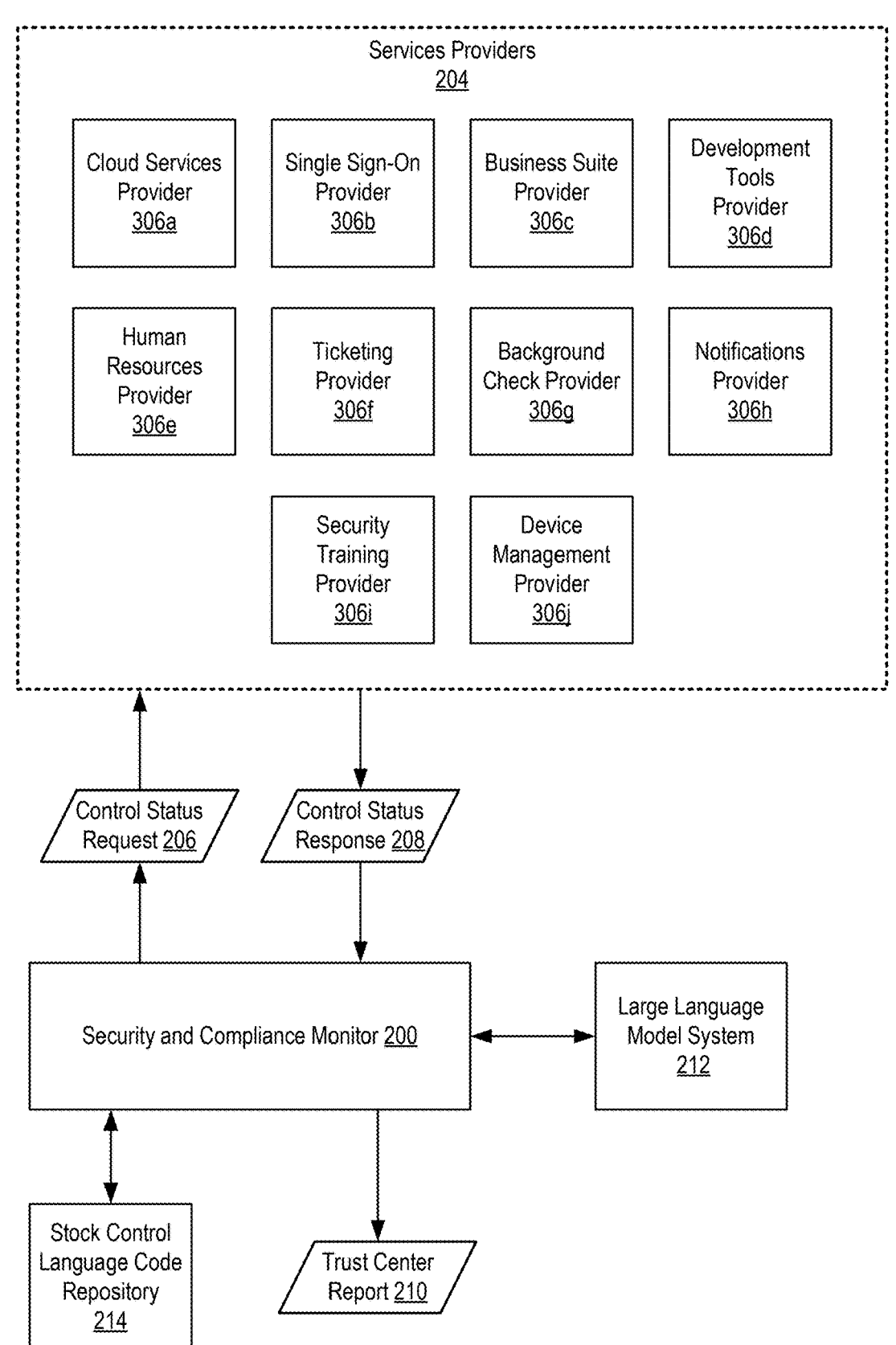
FIG. 3 illustrates an example system for security and compliance monitoring in accordance with some implementations.

For further explanation, FIG. 3 illustrates an exemplary block diagram depicting a system for security and compliance monitoring in accordance with some embodiments of the present disclosure. Specifically, the system of FIG. 3 includes details of the interactions between the security and compliance monitor 200 and service providers 204. FIG. 3 also shows example services providers 204 from which control statuses are retrieved.

The services providers 204 in FIG. 3 include a cloud services provider 306a, a single sign-on provider 306b, business suite provider 306c, a development tools provider 306d, a human resources provider 306c, a ticketing provider 306f, a background check provider 306g, a notifications provider 306h, a security training provider 306i, and a device management provider 306j.

A cloud services provider 306a is a supplier of a cloud-based platform, infrastructure, application or storage services. Examples of controls for cloud services providers 306a include frequency of data backups, level of data security, and location of stored data. A single sign-on provider 306b is a supplier of authentication across multiple third-party applications. Examples of controls for single sign-on providers include access controls, level of access for each user, and role-level security. A business suite provider 306c is a supplier of business applications for communications and data operations across and within businesses. Examples of controls for business suite providers include customer data handling, data access controls, and communications data security. A development tools provider 306d is a supplier of applications that allow developers to create, test and debug software. Examples of controls for development tools providers include customer data handling, best practices implementations, and data access controls.

A human resources provider 306e is a supplier of employee management software and services. Examples of controls for human resources providers include employee data security and employee safety metrics. A ticketing provider 306f is a supplier of applications and services for addressing information technology issues. Examples of controls for ticketing providers include data access controls, employee data security, and customer data security. A background check provider 306g is a supplier of services to review potential employee's criminal, commercial and financial records. Examples of controls for background check providers include employee data security and potential employee data security. A notifications provider 306h is a supplier of communications applications for an enterprise environment. Examples of controls for notifications providers include employee data security and communications data security. A security training provider 306i is a supplier of training systems for enterprise employees. Examples of controls for security training providers include training completion level for each employee, and employee data security. A device management provider 306j is a supplier of services that control data, configuration settings and applications on all devices used within an enterprise. Examples of controls for device management providers include device security, device access controls, and employee data security. As discussed above, the services providers may include services that are not cloud-based services.

In order to instill confidence in their clients, an organization may provide a trust center report 210. A trust center report 210 is a presentation of information about an organization's practices, policies, and procedures on privacy, security, transparency, and compliance. An automated trust center is a trust center report 210 in which the status of the controls that make up the trust center are retrieved and updated automatically (e.g., by a security and compliance monitor 200). An automated trust center that provides real-time security and compliance monitoring is a trust center that reflects the current status of each control with minimal delay for retrieval and/or based on a service level agreement.

Figure 4:
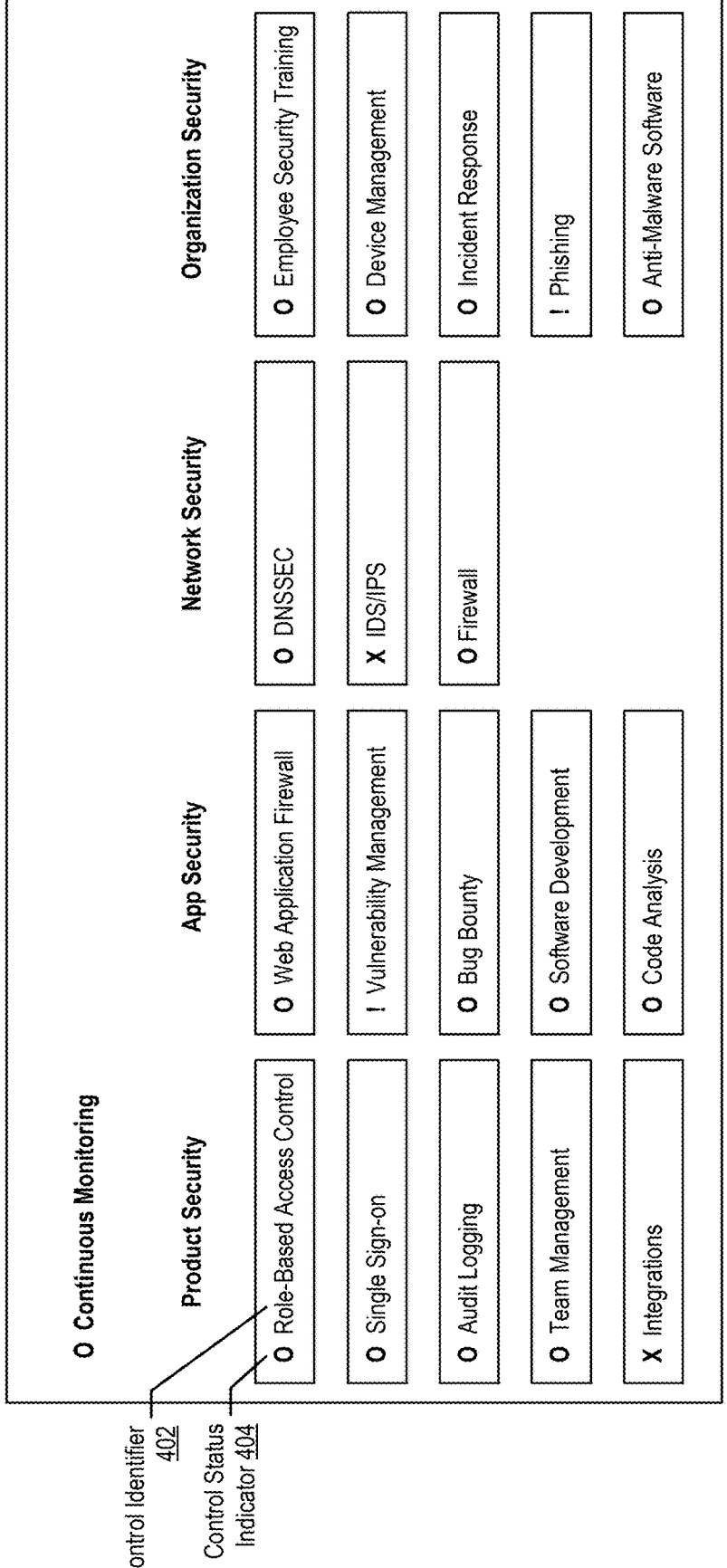
FIG. 4 illustrates an example trust center report in accordance with some implementations.

For further explanation, FIG. 4 illustrates an exemplary trust center report 210 in accordance with some embodiments of the present disclosure. As discussed above, a trust center report 210 is a collection of control statuses for controls selected for the trust center. The trust center controls may be selected as those of particular interest to organization clients. Alternatively, or additionally, the trust center controls may be selected from a widely-used standards framework. The trust center report 210 may be embodied as a dynamic webpage retrievable via a link within the organization's domain. Although appearing to be part of the organization's website, when requested, some or all of the webpage may be retrieved from the security and compliance monitor.

As shown in FIG. 4, the trust center report 210 presents controls and the associated control statuses retrieved by the security and compliance monitor. The trust center report 210 includes a control identifier 402 for each control and a control status indicator 404 that displays a symbol to signify the status of the associated control. Specifically, a control status indicator 404 of "O" indicates that the control is in compliance, a control status indicator 404 of "!" indicates that the control is out of compliance but not yet failing, and a control status indicator 404 of "X" indicates that the control is failing. The amount of time before a failed test for a control renders that control to be out-of-compliance may be set by the organization via a service level agreement (SLA) with the security and compliance monitor, based on the compliance standard itself, set by the platform globally for all organization's trust center, or set by the platform for the entity based on a variety of factors of the organization (organization size, type of organization, business segment of the organization, age of the organization, and so on). The security and compliance monitor, when hosting trust centers for organizations, may enable an organization to customize the trust center for branding purposes.

In some implementations, clicking on any of these controls may provide various information to a user of the trust center report 210. For example, clicking on an anti-DDoS control may provide a user with the various protocols or hardware in place to rebuff such DDoS attacks. The trust center report 210 may also provide evidence of the monitoring when a control is clicked on. That is, when clicking on, for example, "Single Sign On," not only might trust center provide details regarding the IDP utilized by the entity to provide single sign on, but also the date, time, and specifics of a recent test of the entities IDP in practice.

While particular combinations of various functions and features of the one or more embodiments are expressly described herein, other combinations of these features and functions arc likewise possible. The present disclosure is not limited by the particular examples disclosed herein and expressly incorporates these other combinations.

Figure 5:
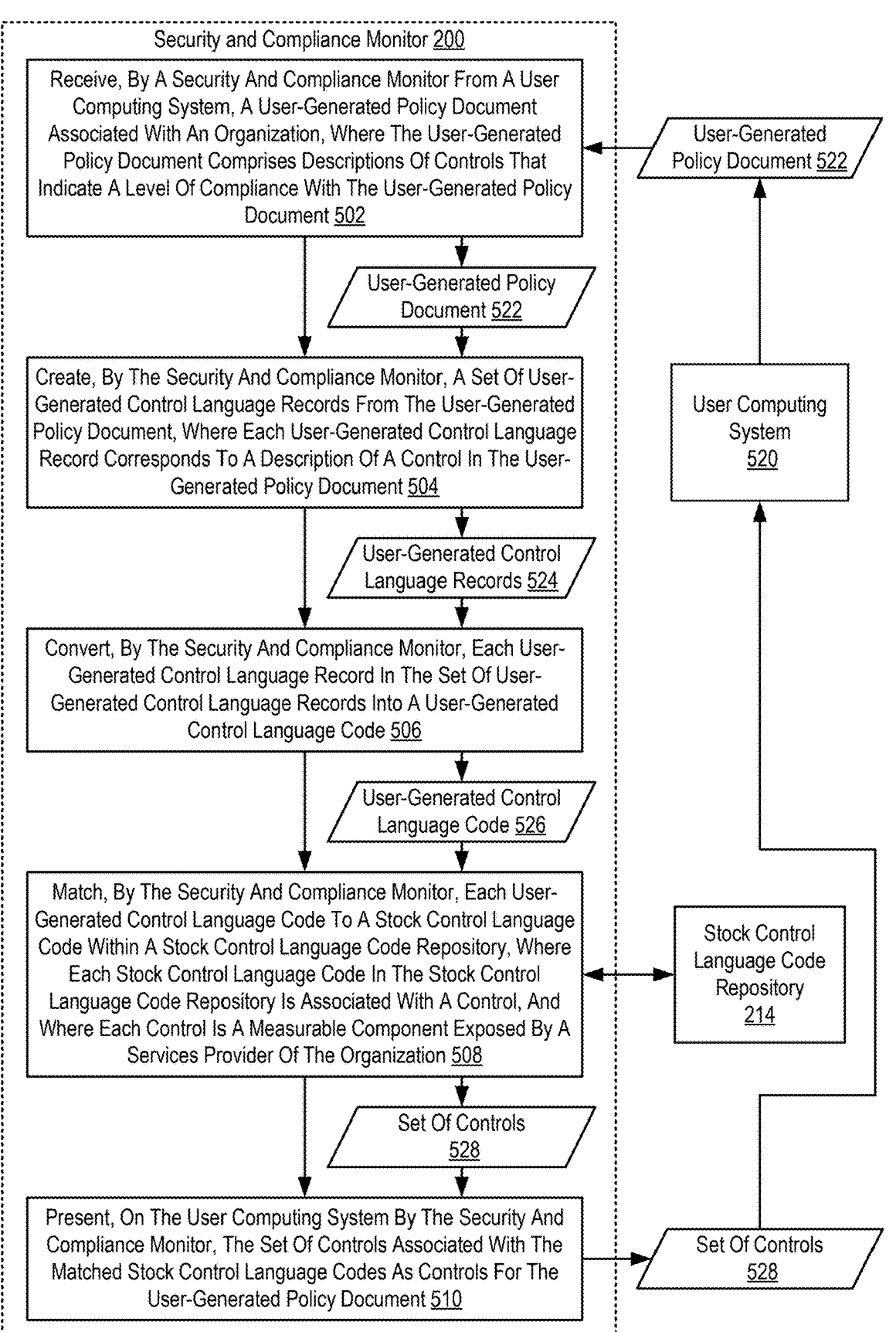
FIG. 5 sets forth a flow chart illustrating an exemplary method for determining policy content-based controls for real-time security and compliance monitoring according to embodiments of the present invention.

For further explanation, FIG. 5 sets forth a flow chart illustrating an exemplary method for a determining policy content-based controls for real-time security and compliance monitoring according to embodiments of the present invention. Although depicted in less detail, the system may include some or all of the components described above. The example method depicted in FIG. 5 may be used if a security and compliance monitor 200 is tasked with creating a trust center report for a user-generated policy (instead of a template policy or framework known to the security and compliance monitor 200). In such a case, the security and compliance monitor 200 must determine a set of controls for the user-generated policy.

The method of FIG. 5 includes receiving 502, by a security and compliance monitor 200 from a user computing system 520, a user-generated policy document 522 associated with an organization, wherein the user-generated policy document 522 comprises descriptions of controls that indicate a level of compliance with the user-generated policy document 522. Receiving 502 the user-generated policy document 522 associated with an organization may be carried out by a user of the user computing system 522 uploading the user-generated policy document 522 or otherwise sending the user-generated policy document 522 to the security and compliance monitor 200. The data comprising the user-generated policy document 522 may be received by the security and compliance monitor 200 as a data file storing the text of the user-generated policy. Alternatively, the text of the user-generated policy from within the user-generated policy document 522 may be entered into a text field on a form presented by security and compliance monitor 200.

The user-generated policy document 522 is data that includes a policy in force (or planning to be in force) by an organization. Further, the user-generated policy document 522 is a policy document and policy that the security and compliance monitor 200 has not yet encountered. Specifically, the user-generated policy document 522 includes a policy that is not included in the security and compliance policies accessible by the security and compliance monitor 200. The user-generated policy document 522 may include a policy that was drafted specifically for the particular organization and has been implemented by that organization. The user-generated policy document 522 may be, for example, a privacy policy, data governance, HR policy, or any other policy in force (or planning to be in force) by the organization. The user computing system 520 is a computing system under the control of a user working on behalf of the organization.

The user-generated policy document 522 includes descriptions of controls that indicate a level of compliance with the user-generated policy document 522. Specifically, the user-generated policy document 522 includes descriptions of obligations an organization has committed to fulfilling. For example, the user-generated policy document 522 may recite that "user data is encrypted using military grade encryption techniques". Although the specific controls may not be explicit within the text of the user-generated policy document 522, the obligations described in the user-generated policy document 522 may subsequently be mapped to a specific set of controls (as described below).

The method of FIG. 5 also includes creating 504, by the security and compliance monitor 200, a set of user-generated control language records 524 from the user-generated policy document 522, wherein each user-generated control language record 524 corresponds to a description of a control in the user-generated policy document 522. Creating 504 the set of user-generated control language records 524 from the user-generated policy document 522 may be carried out by isolating each control description within the user-generated policy document 522 and generating control language records using the text provided in the control description. Each user-generated control language record 524 may be created to correspond to a description of a control in the user-generated policy document 522. Further, each user-generated control language record may include, for example, terms and phrases from the user-generated policy document 522, a summary of the relevant section of the user-generated policy document 522, and activities to be monitored by the control. The keywords and descriptions may be extracted from the user-generated policy document 522 by the security and compliance monitor 200.

For example, a user-generated policy document 522 covering data retention may include three paragraphs—a first covering types of data for archiving, a second covering archiving timelines, and a third covering deletion. The security and compliance monitor 200 may create a user-generated control language record 524 for each paragraph. The first user-generated control language record may include a quote from the first paragraph describing which data is to be archived, a summary of the paragraph, and the activities to be monitored regarding the archived data types. The second user-generated control language record may include a quote from the second paragraph describing the timeline for creating archives, a summary of the paragraph, and the activities to be carried out regarding the archiving timelines. The third user-generated control language record may include a quote from the third paragraph describing which data is to be deleted, a summary of the paragraph, and the activities to be carried out regarding data deletion.

The method of FIG. 5 also includes converting 506, by the security and compliance monitor 200, each user-generated control language record in the set of user-generated control language records 524 into a user-generated control language code 526. Converting 506 each user-generated control language record in the set of user-generated control language records 524 into a user-generated control language code 526 may be carried out by processing each user-generated control language record for greater comparability (relative to the human-readable form of the user-generated control language record) to descriptions of the controls maintained by the security and compliance monitor 200. Each user-generated control language code is data that represents the user-generated control language record mathematically. Processing each user-generated control language record into a user-generated control language code may include applying an algorithm (such as a hash function) that converts the user-generated control language record into an alpha-numerical, numerical, or binary representation. For example, a user-generated control language record may be converted into the user-generated control language code using vectorization. Text vectorization is the process of converting text into a vector of real numbers. The user-generated control language record may be converted into the user-generated control language code in the same manner that each of the descriptions of the controls maintained by the security and compliance monitor 200 are converted into the stock control language codes within the stock control language code repository 214.

The method of FIG. 5 also includes matching 508, by the security and compliance monitor 200, each user-generated control language code 526 to a stock control language code within a stock control language code repository 214, wherein each stock control language code in the stock control language code repository 214 is associated with a control, and wherein each control is a measurable component exposed by a services provider of the organization. Matching 508 each user-generated control language code 526 to a stock control language code within a stock control language code repository 214 may be carried out by the security and compliance monitor 200 searching the stock control language code repository 214 to determine the most similar stock control language code to the user-generated control language code. The user-generated control language codes may be used as keys into the stock control language code repository 214 to find a best-matching stock control language codes for each user-generated control language code. Each user-generated control language code may be compared to each stock control language code in the stock control language code repository 214 and a stock control language code that differs the least from the user-generated control language code may be selected as the best-matching stock control language code for that user-generated control language code. For example, a user-generated control language code may be matched to a stock control language code based on similarities between the vectors of each code. Consequently, the stock control language records corresponding to the best-matching stock control language codes may then be selected as the matched stock control language records.

As described above, each stock control language code in the stock control language code repository may be generated by creating a mathematical representation of (e.g., vectorizing) each of the stock control language records to create the stock control language codes. Specifically, an algorithm may be applied to convert each individual stock control language record into a stock control language code. The stock control language code may include an identifier of the stock control language record from which the stock control language code has been created, allowing the security and compliance monitor 200 to retrieve the corresponding matched stock control language record once the user-generated control language code has been matched to a stock control language code. Given a set of stock control language records, the security and compliance monitor 200 may determine the corresponding set of controls 528 to the matched stock control language codes. The set of controls 528 may be extracted from the matched stock control language records and compiled into a human-readable list of the set of controls 528.

Matching 508 each user-generated control language code 526 to a stock control language code within a stock control language code repository 214 may include limiting the stock control language codes in the stock control language code repository 214 to subset of stock control language codes for comparison and matching. Such a subset may prevent the security and compliance monitor 200 from matching an unrelated stock control language record to a user-generated control language record because even if the codes are similar (e.g., the records share similar language to describe entirely different kinds of controls).

The subset of stock control language codes may be generated dynamically based on input from the user of the user computing system 520 (e.g., input received with the user-generated policy document 522). Specifically, the user may send input to the security and compliance monitor 200 indicating a limitation (such as a category or scope) to be placed on the control results. Alternatively, or additionally, the subset of stock control language codes may be generated by the security and compliance monitor 200 based on the text of the user-generated policy document 522. For example, the security and compliance monitor 200 (or LLM system under the direction of the security and compliance monitor 200) may iterate through the user-generated policy document 522 to determine a limitation to apply for the subset creation. The security and compliance monitor 200 may then use this limitation in the creation of the subset of stock control language code by only including the stock control language code with corresponding stock control language records that match the limitation.

The method of FIG. 5 also includes presenting 510, on the user computing system by the security and compliance monitor 200, the set of controls 528 associated with the matched stock control language codes as controls for the user-generated policy document 522. Presenting 510 the set of controls 528 associated with the matched stock control language codes as controls for the user-generated policy document 522 may be carried out by sending a list of the set of controls 528 to the user computing system 520. Each control may have an explanation of that control's purpose and how the control may be accessed. The set of controls 528 presented may include a link or other mechanism to implement the controls within the organization. For example, the user of the user computing system 520 may be prompted to grant the security and compliance monitor 200 access to the exposed APIs of the service providers relevant to each control.

The above steps improve the operation of the computer system by allowing a user to submit an original policy to the security and compliance monitor 200 and receive a suggested set of controls for that policy. This is accomplished by converting the original policy to a set of user-generated control language records, converting the user-generated control language records into user-generated control language codes, matching the user-generated control language codes to stock control language codes for stock control language records, and providing the set of controls from the stock control language records as suggested controls for the original policy.

For further explanation, FIG. 6 sets forth a flow chart illustrating a further exemplary method for determining policy content-based controls for real-time security and compliance monitoring according to embodiments of the present invention that includes receiving 502, by a security and compliance monitor 200 from a user computing system 520, a user-generated policy document 522 associated with an organization, wherein the user-generated policy document 522 comprises descriptions of controls that indicate a level of compliance with the user-generated policy document 522; creating 504, by the security and compliance monitor 200, a set of user-generated control language records 524 from the user-generated policy document 522, wherein each user-generated control language record 524 corresponds to a description of a control in the user-generated policy document 522; converting 506, by the security and compliance monitor 200, each user-generated control language record in the set of user-generated control language records 524 into a user-generated control language code 526; matching 508, by the security and compliance monitor 200, each user-generated control language code 526 to a stock control language code within a stock control language code repository 214, wherein each stock control language code in the stock control language code repository 214 is associated with a control, and wherein each control is a measurable component exposed by a services provider of the organization; and presenting 510, on the user computing system by the security and compliance monitor 200, the set of controls 528 associated with the matched stock control language codes as controls for the user-generated policy document 522.

The method of FIG. 6 differs from the method of FIG. 5, however, in that the method of FIG. 6 further includes accessing 602, from the services providers 204 of the organization, each control of the set of controls 528 to retrieve a control status 620; and generating 604 a trust center report 210 using the control statuses 620 indicating a level of compliance with the user-generated policy document 522.

Accessing 602, from the services providers 204 of the organization, each control of the set of controls 528 to retrieve a control status 620 may be carried out by issuing a control status request to the organization services providers 204 and receiving, in response, the control status responses. The control status requests may be commands submitted via a command line interface exposed by the organization services providers 204. The control status responses may be state specifications provided in response to the submitted commands.

Accessing 602 each control of the set of controls 528 to retrieve a control status 620 may be carried out periodically. Specifically, each control status response may be retrieved at the expiration of a period of time set for each control status. The period of time may be different for each control status and may be based on various factors, including, for example, the severity of failing the control, historical data indicating frequency of failure events, and system efficiency.

Once the control status responses are retrieved, the control status may then be determined. Determining the control status for each control of the trust center report 210 based on the control status responses may be carried out by translating the control status responses into control statuses 620 for each control of the trust center report 210. Specifically, the control status responses may include additional information unrelated to the individual control status. Further, the control status responses may not succinctly indicate the control status of the control. Consequently, the security and compliance monitor 200 may perform various operations on the control status responses in order to extract the control status 620. For example, the security and compliance monitor 200 may compare elements in a control status response to a value (such as a minimum or maximum value allowed) to determine the control status for the control.

For example, for one control status, the security and compliance monitor 200 may generate a command requesting the frequency of data backups performed on a particular data set. The security and compliance monitor 200 may then send the command to a cloud services provider via a command line interface. In response, the security and compliance monitor 200 may receive a state specification detailing that the particular data set is backed up once a day. The security and compliance monitor 200 may then extract the frequency of once a day from the control status response and compare that value with the minimum value for the control. If the frequency of once a day is at least as frequent as required by the trust center report, then the control status for that control would be "in compliance".

Generating 604 a trust center report 210 using the control statuses 620 indicating a level of compliance with the user-generated policy document 522 may be carried out by identifying the control status indicators corresponding to the control statuses 620. The control status indicators and the control identifiers may then be organized into the trust center report 210.

Figure 7:
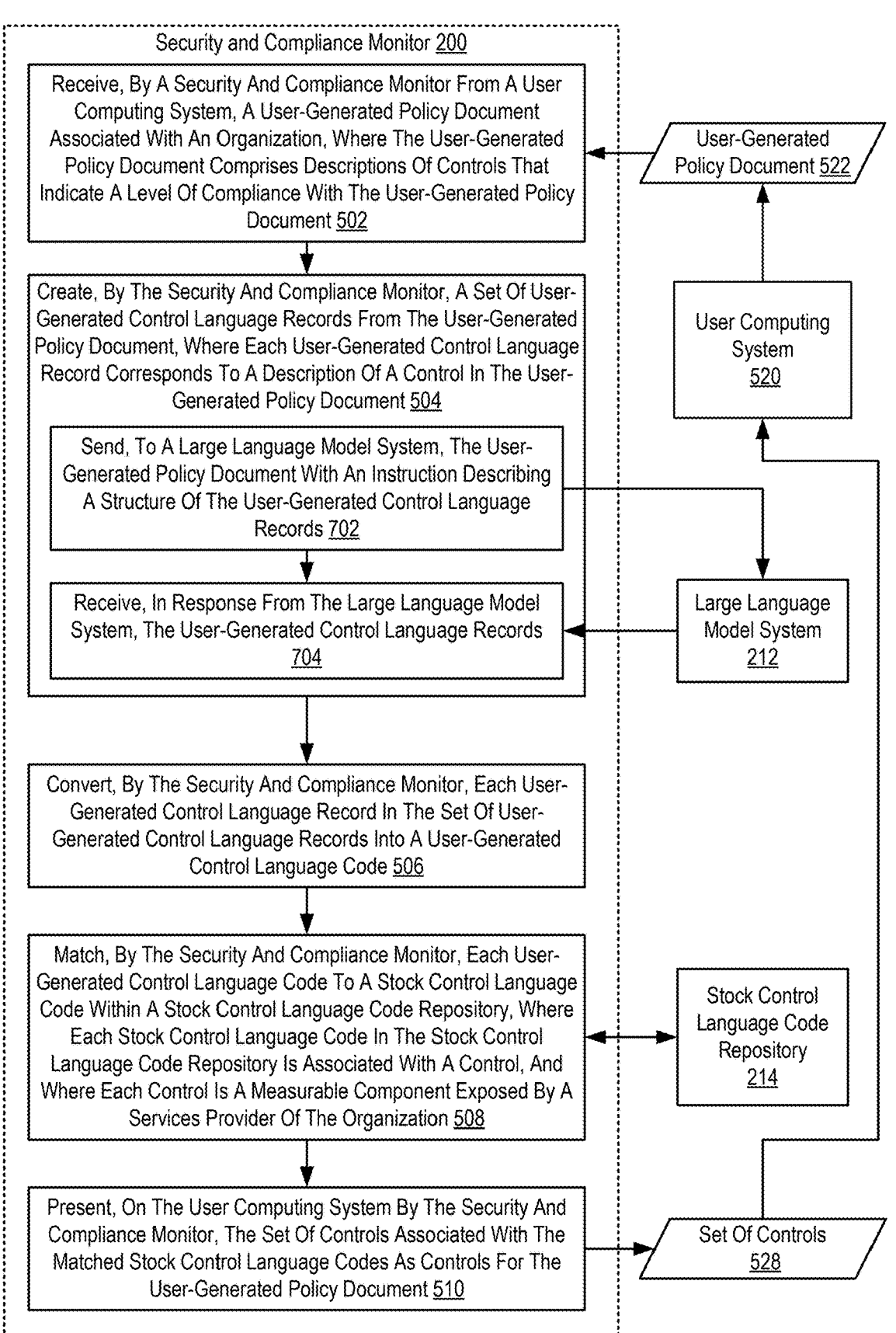
FIG. 7 sets forth a flow chart illustrating an exemplary method for determining policy content-based controls for real-time security and compliance monitoring according to embodiments of the present invention.

For further explanation, FIG. 7 sets forth a flow chart illustrating a further exemplary method for determining policy content-based controls for real-time security and compliance monitoring according to embodiments of the present invention that includes receiving 502, by a security and compliance monitor 200 from a user computing system 520, a user-generated policy document 522 associated with an organization, wherein the user-generated policy document 522 comprises descriptions of controls that indicate a level of compliance with the user-generated policy document 522; creating 504, by the security and compliance monitor 200, a set of user-generated control language records 524 from the user-generated policy document 522, wherein each user-generated control language record 524 corresponds to a description of a control in the user-generated policy document 522; converting 506, by the security and compliance monitor 200, each user-generated control language record in the set of user-generated control language records 524 into a user-generated control language code 526; matching 508, by the security and compliance monitor 200, each user-generated control language code 526 to a stock control language code within a stock control language code repository 214, wherein each stock control language code in the stock control language code repository 214 is associated with a control, and wherein each control is a measurable component exposed by a services provider of the organization; and presenting 510, on the user computing system by the security and compliance monitor 200, the set of controls 528 associated with the matched stock control language codes as controls for the user-generated policy document 522.

The method of FIG. 7 differs from the method of FIG. 5, however, in that creating 504, by the security and compliance monitor 200, a set of user-generated control language records 524 from the user-generated policy document 522, wherein each user-generated control language record 524 corresponds to a description of a control in the user-generated policy document 522 includes sending 702, to a large language model system 212, the user-generated policy document 522 with an instruction describing a structure of the user-generated control language records; and receiving 704, in response from the large language model system 212, the user-generated control language records 524.

Sending 702, to a large language model system 212, the user-generated policy document 522 with an instruction describing a structure of the user-generated control language records may be carried out by the security and compliance monitor 200 generating an LLM system message that includes the user-generated policy document 522 and the description of the structure of the user-generated control language records. The structure of the user-generated control language records may be, for example, one portion that includes terms and phrases from the user-generated policy document 522, a second portion that includes a summary of the relevant section of the user-generated policy document 522, and a third section that includes activities to be monitored by the control. Receiving 704, in response from the large language model system 212, the user-generated control language records 524 may be carried out by the LLM system 212 using the model to generate the set of user-generated control language records and send the set of user-generated control language records to the security and compliance monitor 200.

Figure 8:
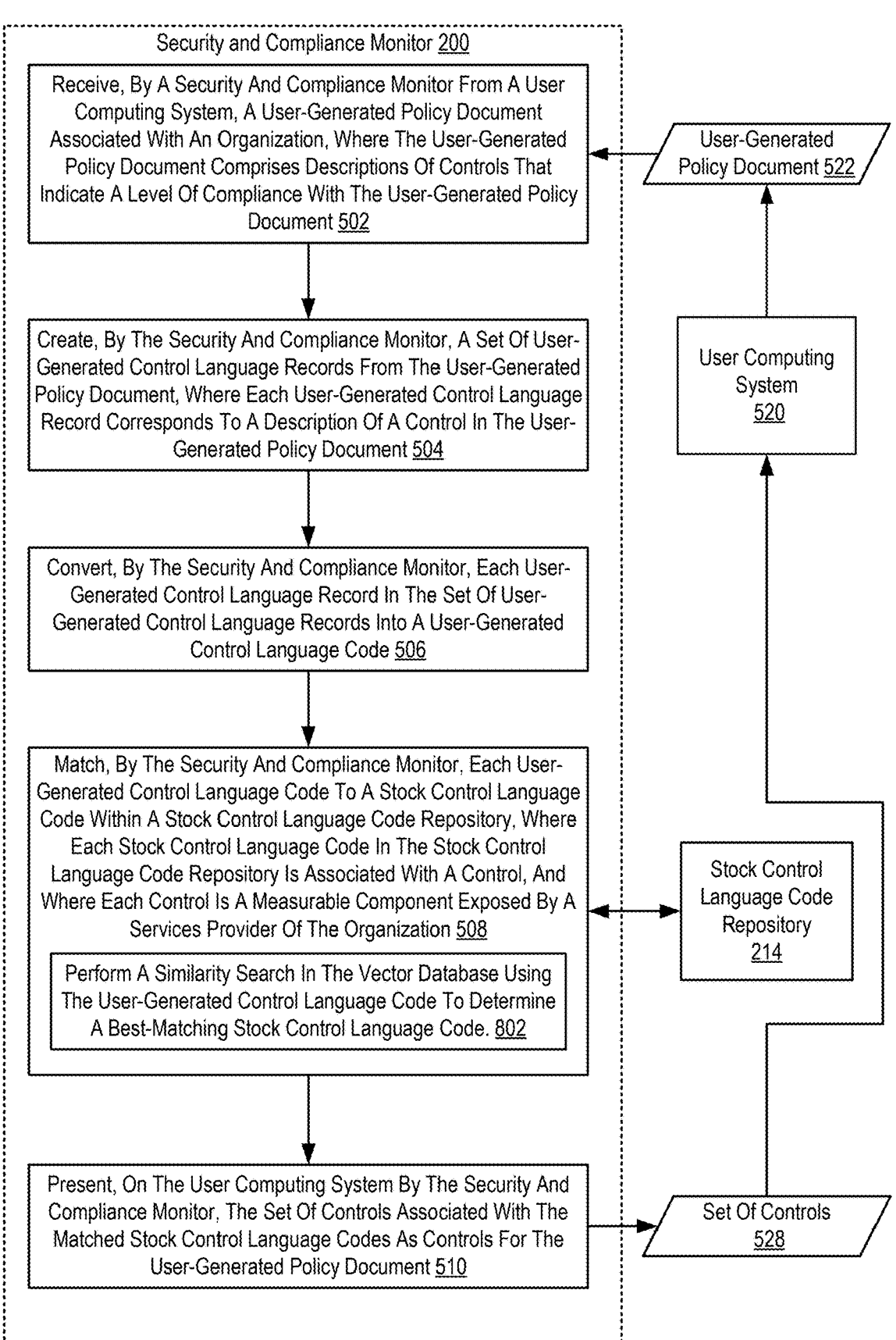
FIG. 8 sets forth a flow chart illustrating an exemplary method for determining policy content-based controls for real-time security and compliance monitoring according to embodiments of the present invention.

For further explanation, FIG. 8 sets forth a flow chart illustrating a further exemplary method for determining policy content-based controls for real-time security and compliance monitoring according to embodiments of the present invention that includes receiving 502, by a security and compliance monitor 200 from a user computing system 520, a user-generated policy document 522 associated with an organization, wherein the user-generated policy document 522 comprises descriptions of controls that indicate a level of compliance with the user-generated policy document 522; creating 504, by the security and compliance monitor 200, a set of user-generated control language records 524 from the user-generated policy document 522, wherein each user-generated control language record 524 corresponds to a description of a control in the user-generated policy document 522; converting 506, by the security and compliance monitor 200, each user-generated control language record in the set of user-generated control language records 524 into a user-generated control language code 526; matching 508, by the security and compliance monitor 200, each user-generated control language code 526 to a stock control language code within a stock control language code repository 214, wherein each stock control language code in the stock control language code repository 214 is associated with a control, and wherein each control is a measurable component exposed by a services provider of the organization; and presenting 510, on the user computing system by the security and compliance monitor 200, the set of controls 528 associated with the matched stock control language codes as controls for the user-generated policy document 522.

The method of FIG. 8 differs from the method of FIG. 5, however, in that matching 508, by the security and compliance monitor 200, each user-generated control language code 526 to a stock control language code within a stock control language code repository 214, wherein each stock control language code in the stock control language code repository 214 is associated with a control, and wherein each control is a measurable component exposed by a services provider of the organization includes performing 802 a similarity search in the vector database using the user-generated control language code to determine a best-matching stock control language code. Performing 802 a similarity search in the vector database using the user-generated control language code to determine a best-matching stock control language code may be carried out by iterating through the vector database with each vector representing each user-generated control language code to obtain the most similar vectors representing the stock control language codes.

Advantages and features of the present disclosure can be further described by the following statements:

1. A method of receiving, by a security and compliance monitor from a user computing system, a user-generated policy document associated with an organization, wherein the user-generated policy document comprises descriptions of controls that indicate a level of compliance with the user-generated policy document; creating, by the security and compliance monitor, a set of user-generated control language records from the user-generated policy document, wherein each user-generated control language record corresponds to a description of a control in the user-generated policy document; converting, by the security and compliance monitor, each user-generated control language record in the set of user-generated control language records into a user-generated control language code; matching, by the security and compliance monitor, each user-generated control language code to a stock control language code within a stock control language code repository, wherein each stock control language code in the stock control language code repository is associated with a control, and wherein each control is a measurable component exposed by a services provider of the organization; and presenting, on the user computing system by the security and compliance monitor, the set of controls associated with the matched stock control language codes as controls for the user-generated policy document.

2. The method of statement 1, further comprising: accessing, from the services providers of the organization, each control of the set of controls to retrieve a control status; and generating a trust center report using the control statuses indicating a level of compliance with the user-generated policy document.

3. The method of statement 2 or statement 1, wherein creating the set of user-generated control language records from the user-generated policy document comprises: sending, to a large language model system, the user-generated policy document with an instruction describing a structure of the user-generated control language records; and receiving, in response from the large language model system, the user-generated control language records.

4. The method of statement 3, statement 2, or statement 1, wherein converting each user-generated control language record in the set of user-generated control language records into a user-generated control language code comprises vectorizing each user-generated control language record to generate the user-generated control language code.

5. The method of statement 4, statement 3, statement 2, or statement 1, wherein the stock control language code repository is a vector database, and wherein matching each user-generated control language code to the stock control language code within the stock control language code repository comprises performing a similarity search in the vector database using the user-generated control language code to determine a best-matching stock control language code.

6. The method of statement 5, statement 4, statement 3, statement 2, or statement 1, wherein matching each user-generated control language code to the stock control language code within the stock control language code repository comprises using each user-generated control language code as a key into the stock control language code repository to find a best-matching stock control language code for each user-generated control language code.

7. The method of statement 6, statement 5, statement 4, statement 3, statement 2, or statement 1, wherein each stock control language code in the stock control language code repository is generated by vectorizing each stock control language record to create the stock control language code.

8. The method of statement 7, statement 6, statement 5, statement 4, statement 3, statement 2, or statement 1, wherein the user-generated policy document is a privacy policy document.

9. The method of statement 8, statement 7, statement 6, statement 5, statement 4, statement 3, statement 2, or statement 1, wherein at least one of the services providers of the organization comprise a cloud services provider.

10. The method of statement 9, statement 8, statement 7, statement 6, statement 5, statement 4, statement 3, statement 2, or statement 1, wherein the user-generated policy document comprises a plurality of obligations assigned to the organization.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:

receiving, by a processing device from a user computing system, a user-generated policy document associated with an organization, wherein the user-generated policy document comprises descriptions of controls that indicate a level of compliance with the user-generated policy document;

creating, by the processing device, a set of user-generated control language records from the user-generated policy document, wherein each user-generated control language record corresponds to a description of a control in the user-generated policy document;

converting, by the processing device, each user-generated control language record in the set of user-generated control language records into a user-generated control language code;

matching, by the processing device, each user-generated control language code to a stock control language code within a stock control language code repository, wherein each stock control language code in the stock control language code repository is associated with a control, and wherein each control is a measurable component exposed by a services provider of the organization; and presenting, on the user computing system by the processing device, the set of controls associated with the matched stock control language codes as controls for the user-generated policy document.

2. The method of claim 1, further comprising:

accessing, from the services providers of the organization, each control of the set of controls to retrieve a control status; and generating a trust center report using the control statuses indicating a level of compliance with the user-generated policy document.

3. The method of claim 1, wherein creating the set of user-generated control language records from the user-generated policy document comprises:

sending, to a large language model system, the user-generated policy document with an instruction describing a structure of the user-generated control language records; and receiving, in response from the large language model system, the user-generated control language records.

4. The method of claim 1, wherein converting each user-generated control language record in the set of user-generated control language records into a user-generated control language code comprises vectorizing each user-generated control language record to generate the user-generated control language code.

5. The method of claim 1,
wherein the stock control language code repository is a vector database, and
wherein matching each user-generated control language code to the stock control language code within the stock control language code repository comprises performing a similarity search in the vector database using the user-generated control language code to determine a best-matching stock control language code.

6. The method of claim 1, wherein matching each user-generated control language code to the stock control language code within the stock control language code repository comprises using each user-generated control language code as a key into the stock control language code repository to find a best-matching stock control language code for each user-generated control language code.

7. The method of claim 1, wherein each stock control language code in the stock control language code repository is generated by vectorizing each stock control language record to create the stock control language code.

8. The method of claim 1, wherein the user-generated policy document is a privacy policy document.

9. The method of claim 1, wherein at least one of the services providers of the organization comprise a cloud services provider.

10. The method of claim 1, wherein the user-generated policy document comprises a plurality of obligations assigned to the organization.

11. A system comprising:
a memory; and
a processing device, operatively coupled to the memory, the processing device configured to:
   receive, from a user computing system, a user-generated policy document associated with an organization, wherein the user-generated policy document comprises descriptions of controls that indicate a level of compliance with the user-generated policy document;
   create a set of user-generated control language records from the user-generated policy document, wherein each user-generated control language record corresponds to a description of a control in the user-generated policy document;
   convert each user-generated control language record in the set of user-generated control language records into a user-generated control language code;
   match each user-generated control language code to a stock control language code within a stock control language code repository, wherein each stock control language code in the stock control language code repository is associated with a control, and wherein each control is a measurable component exposed by a services provider of the organization; and
   present, on the user computing system, the set of controls associated with the matched stock control language codes as controls for the user-generated policy document.

12. The system of claim 11, wherein the processing device is further configured to:
   accessing, from the services providers of the organization, each control of the set of controls to retrieve a control status; and generating a trust center report using the control statuses indicating a level of compliance with the user-generated policy document.

13. The system of claim 11, wherein creating the set of user-generated control language records from the user-generated policy document comprises:
   sending, to a large language model system, the user-generated policy document with an instruction describing a structure of the user-generated control language records; and
   receiving, in response from the large language model system, the user-generated control language records.

14. The system of claim 11, wherein converting each user-generated control language record in the set of user-generated control language records into a user-generated control language code comprises vectorizing each user-generated control language record to generate the user-generated control language code.

15. The system of claim 11, wherein
wherein the stock control language code repository is a vector database, and
wherein matching each user-generated control language code to the stock control language code within the stock control language code repository comprises performing a similarity search in the vector database using the user-generated control language code to determine a best-matching stock control language code.

16. The system of claim 11, wherein matching each user-generated control language code to the stock control language code within the stock control language code repository comprises using each user-generated control language code as a key into the stock control language code repository to find a best-matching stock control language code for each user-generated control language code.

17. The system of claim 11, wherein each stock control language code in the stock control language code repository is generated by vectorizing each stock control language record to create the stock control language code.

18. The system of claim 11, wherein the user-generated policy document is a privacy policy document.

19. The system of claim 11, wherein at least one of the services providers of the organization comprise a cloud services provider.

20. A non-transitory computer readable storage medium storing instructions which, when executed, cause a processing device to:
   receive, from a user computing system, a user-generated policy document associated with an organization, wherein the user-generated policy document comprises descriptions of controls that indicate a level of compliance with the user-generated policy document;
   create a set of user-generated control language records from the user-generated policy document, wherein each user-generated control language record corresponds to a description of a control in the user-generated policy document;
   convert each user-generated control language record in the set of user-generated control language records into a user-generated control language code;
   match each user-generated control language code to a stock control language code within a stock control language code repository, wherein each stock control language code in the stock control language code repository is associated with a control, and wherein each control is a measurable component exposed by a services provider of the organization; and present, on the user computing system, the set of controls associated with the matched stock control language codes as controls for the user-generated policy document.

\* \* \* \* \*